United States Patent
Tsuchiya et al.

(10) Patent No.: US 6,965,416 B2
(45) Date of Patent: Nov. 15, 2005

(54) IMAGE PROCESSING CIRCUIT AND METHOD FOR PROCESSING IMAGE

(75) Inventors: Takashi Tsuchiya, Tokyo (JP); Masami Ogata, Kanagawa (JP); Kazuhiko Ueda, Kanagawa (JP)

(73) Assignee: Sony Corporation, Tokyo (JP)

( * ) Notice: Subject to any disclaimer, the term of this patent is extended or adjusted under 35 U.S.C. 154(b) by 848 days.

(21) Appl. No.: 09/816,043

(22) Filed: Mar. 23, 2001

(65) Prior Publication Data

US 2002/0047911 A1    Apr. 25, 2002

(30) Foreign Application Priority Data

Mar. 23, 2000 (JP) .......................... P2000-087053

(51) Int. Cl.$^7$ .............................................. H04N 5/21
(52) U.S. Cl. ...................... 348/606; 348/625; 382/266
(58) Field of Search ............................... 348/606, 607, 348/625, 678, 222.1; 382/261, 263, 264

(56) References Cited

U.S. PATENT DOCUMENTS

| 5,023,919 | A | | 6/1991 | Wataya |
| 5,166,810 | A | | 11/1992 | Sorimachi et al. |
| 5,442,462 | A | * | 8/1995 | Guissin ...................... 358/463 |
| 5,493,622 | A | | 2/1996 | Tsuchino et al. |
| 5,835,618 | A | * | 11/1998 | Fang et al. ................. 382/132 |
| 6,055,340 | A | * | 4/2000 | Nagao ........................ 382/261 |
| 6,373,992 | B1 | * | 4/2002 | Nagao ........................ 382/266 |

* cited by examiner

*Primary Examiner*—Victor R. Kostak
(74) *Attorney, Agent, or Firm*—Sonnenschein, Nath & Rosnthal LLP

(57) ABSTRACT

The present invention relates to an image processing circuit and an image processing method, and is applied to, for example, a video camera, an electronic still camera and the like, for compressing the dynamic range at a high compression rate with evading the lowering of an impression concerning the contrast and the unnatural edge emphasis. The present invention smoothes an input image X while preserving the edge to obtain a gain correction coefficient, and corrects the pixel value $x(i, j)$ of the input image X with the gain correction coefficient.

9 Claims, 18 Drawing Sheets

FIG.1

$S_n = \sum a_k \cdot W_{n-k}$ $\sum a_k = 1$ $|\gamma_n - \gamma_{n-k}| \leq \varepsilon \qquad W_{n-k} = \gamma_{n-k}$ $|\gamma_n - \gamma_{n-k}| > \varepsilon \qquad W_{n-k} = \gamma_n \qquad \cdots\cdots(1)$

FIG.2

$S_n = \sum a_k \cdot W_{n-k}$ $\sum a_k = 1$ $|\gamma_n - \nu_{n-k}| \leq \varepsilon 1 \qquad W_{n-k} = \gamma_{n-k}$ $|\gamma_n - \nu_{n-k}| > \varepsilon 1 \qquad W_{n-k} = \gamma_n + K_a \cdot k \qquad \cdots\cdots(2)$

FIG.3

$\nu_{n-k} = \gamma_{n-k} - K_a \cdot k$ $K_a = \dfrac{\sum \gamma_{s+1} - \gamma_s}{(2M-1)} \qquad \cdots\cdots(3)$

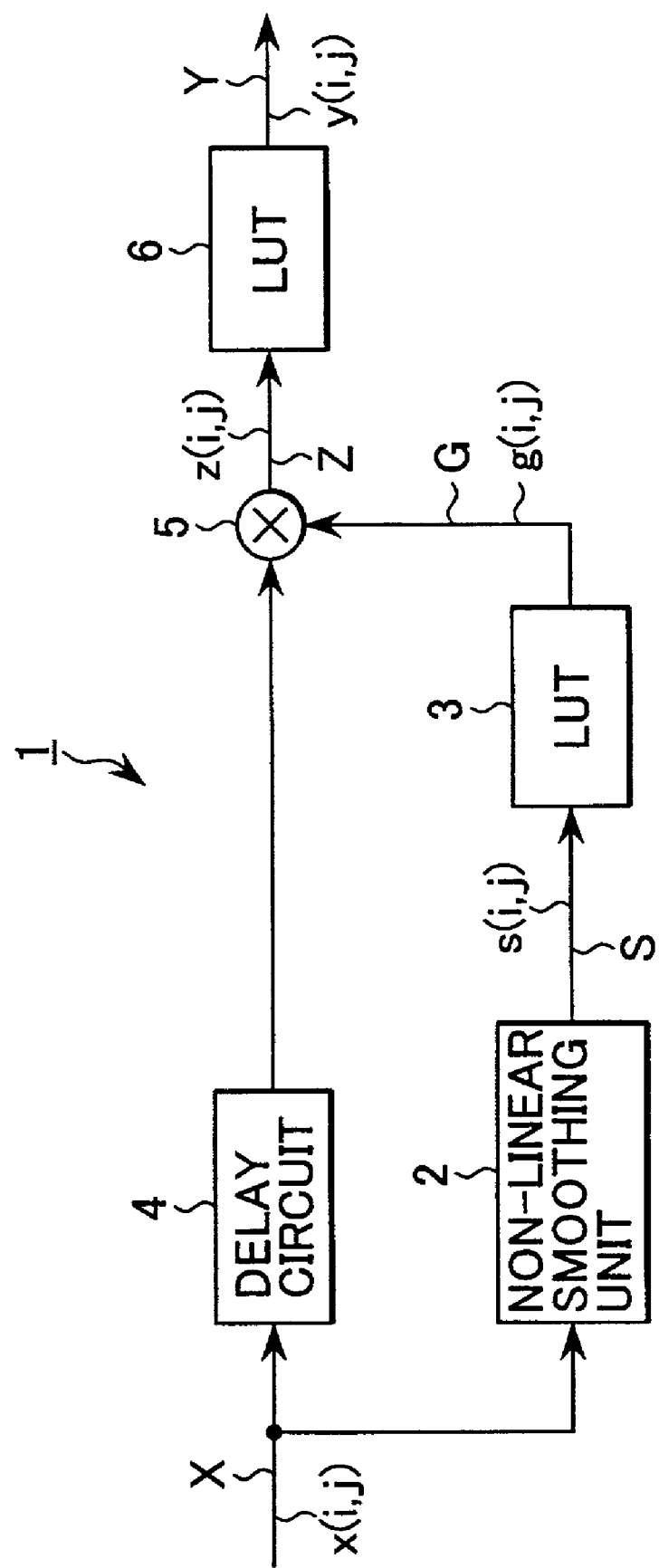

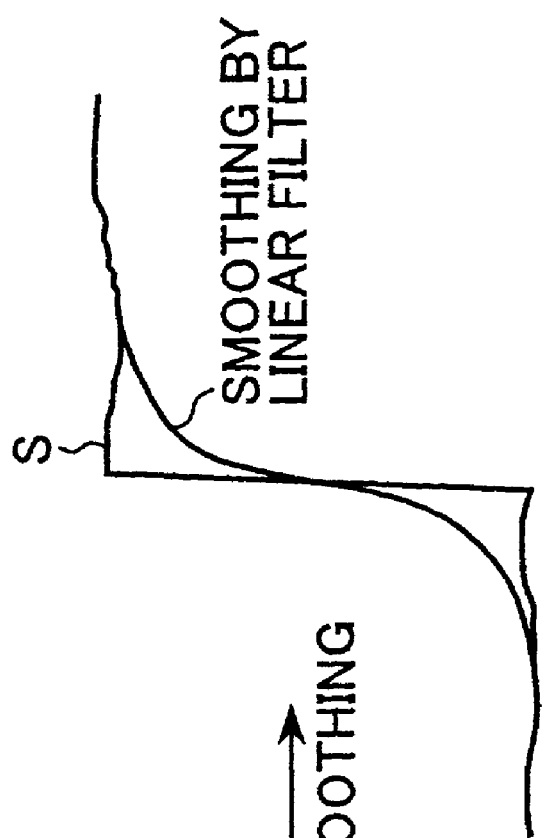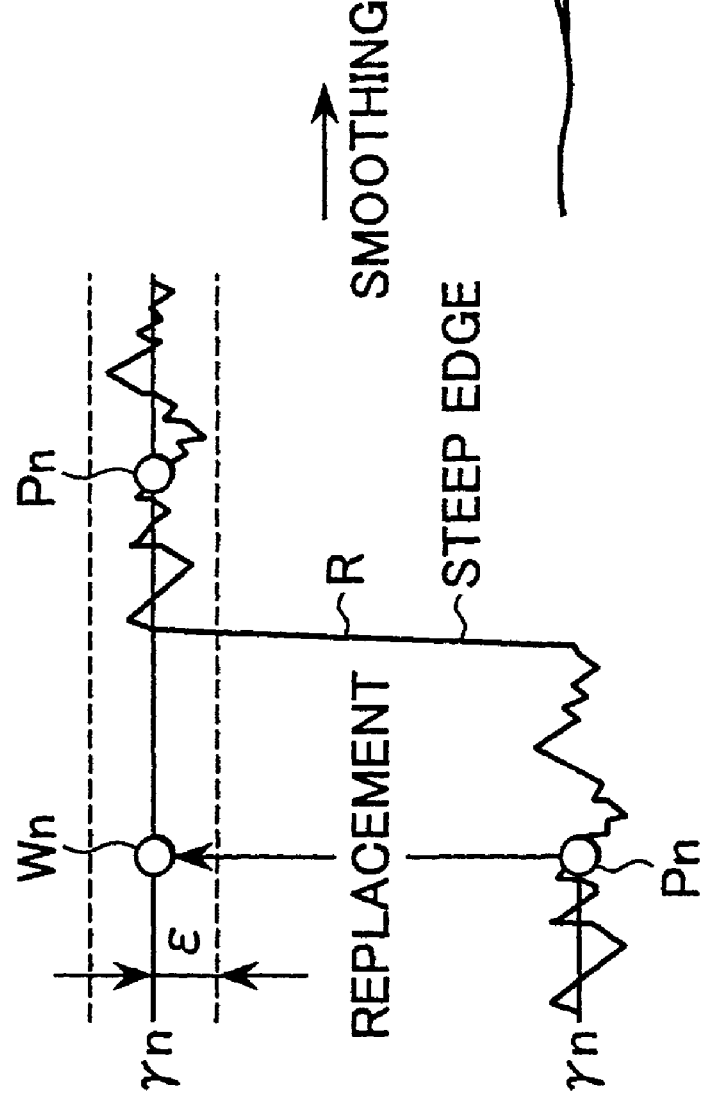

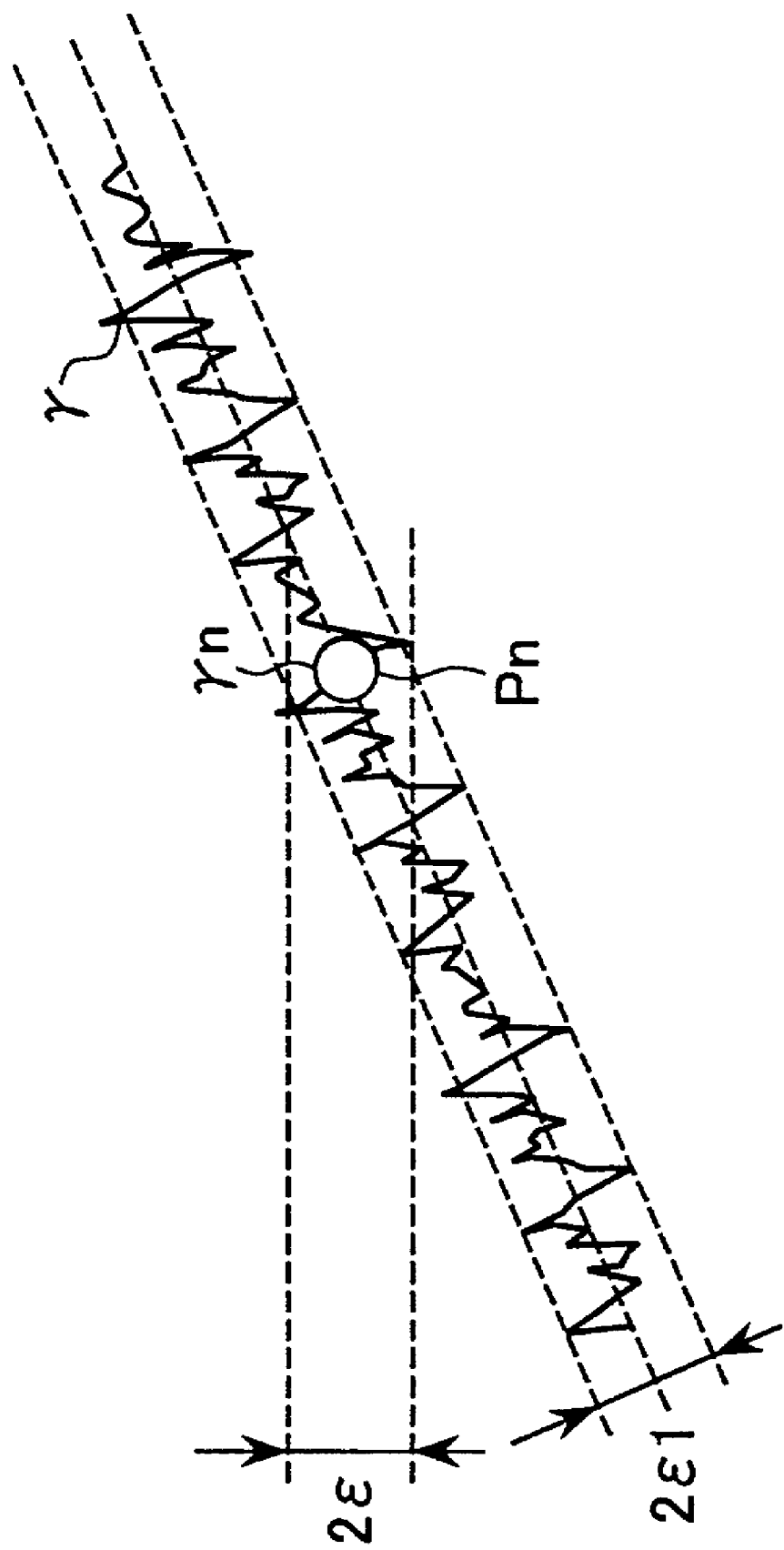

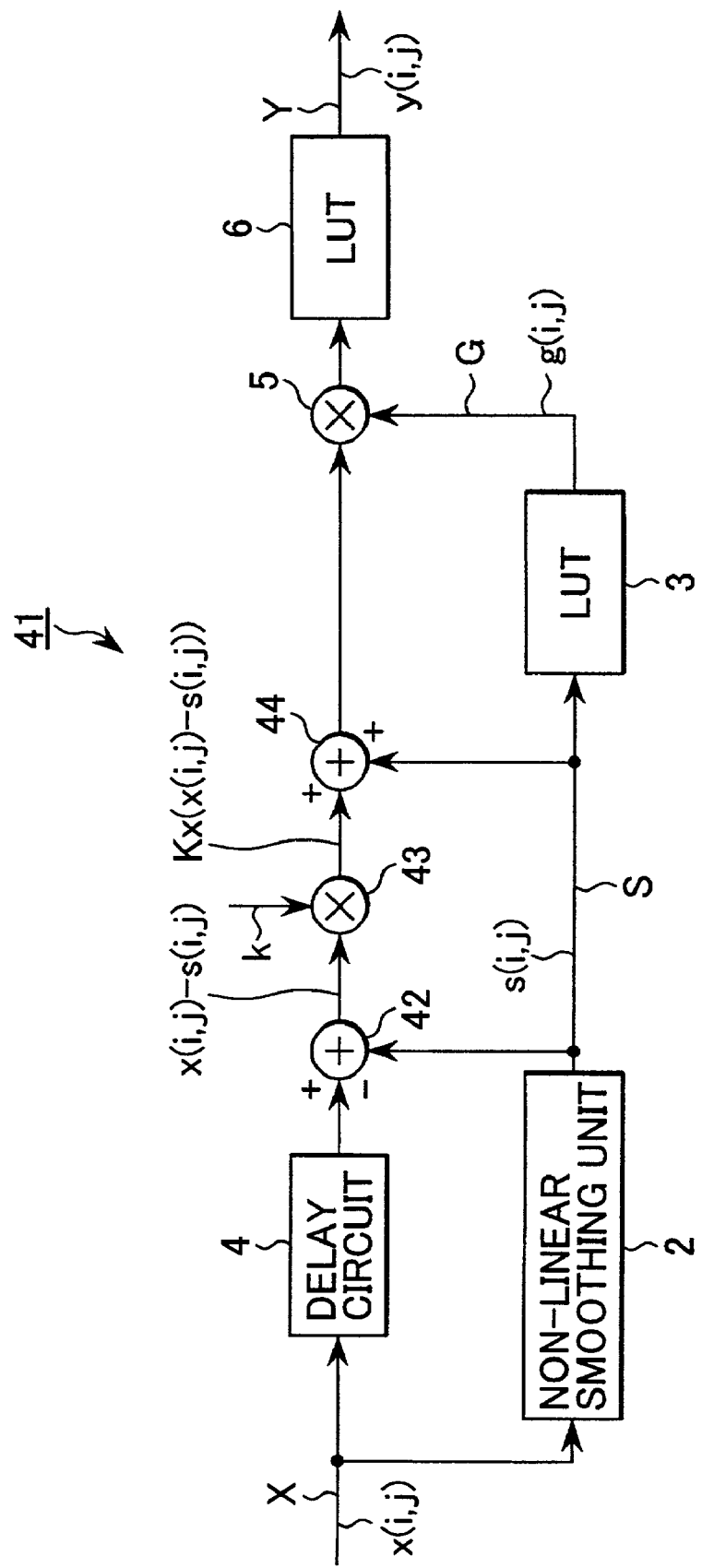

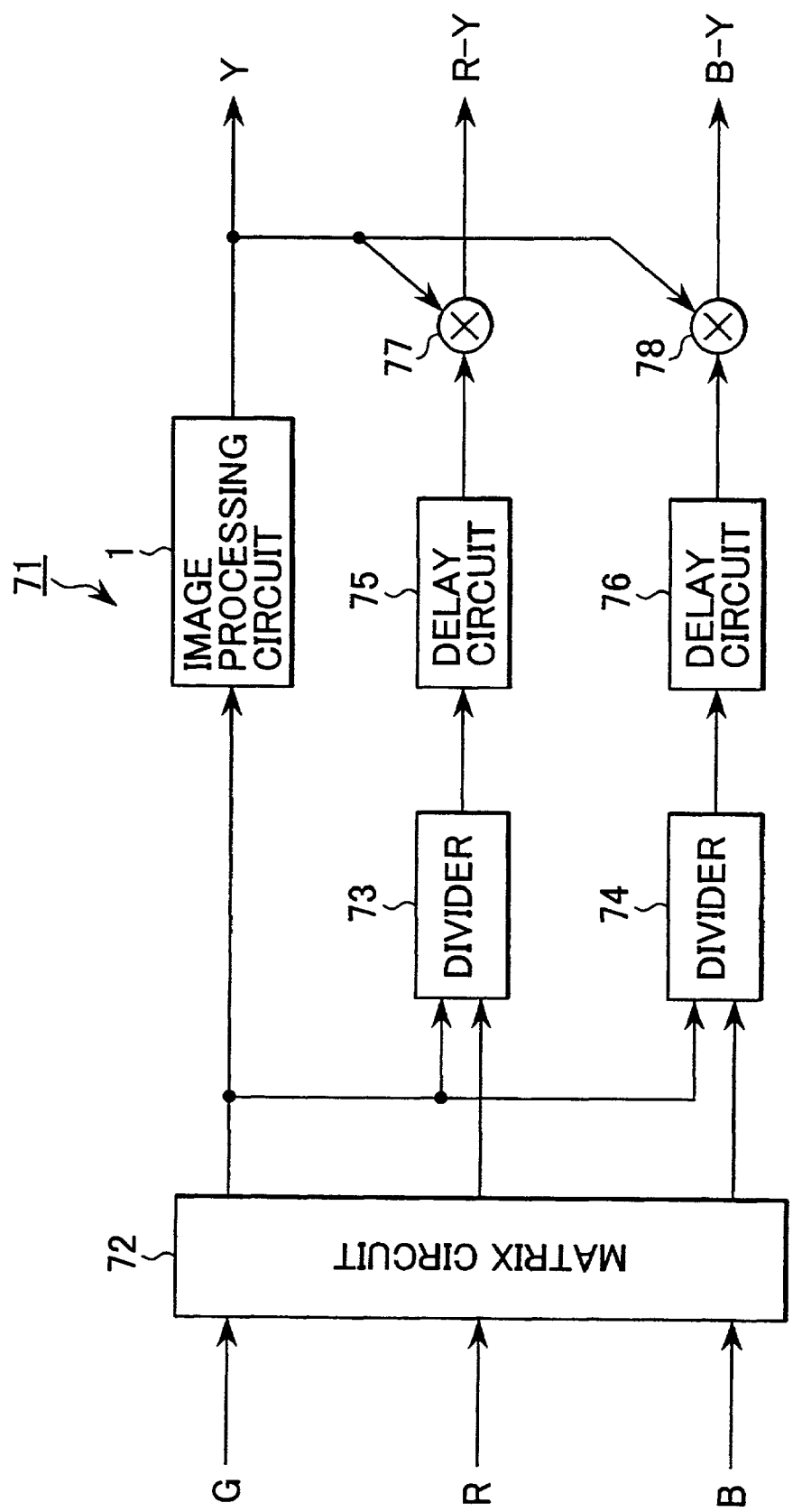

IMAGE PROCESSING CIRCUIT AND METHOD FOR PROCESSING IMAGE

RELATED APPLICATION DATA

The present application claims priority to Japanese Application No. P2000-087053 filed Mar. 23, 2000, which application is incorporated herein by reference to the extent permitted by law.

BACKGROUND OF THE INVENTION

The present invention relates to an image processing circuit and a method for processing an image, and is applicable to, for example, the processing and the recording of the results of imaging with a video camera, an electronic still camera and the like, image displaying on a liquid crystal display and the like, image processing and image synthesis with a personal computer and the like, and image transmission by means of those apparatus.

In conventional various image processing circuits such as an imaging apparatus, various kinds of processing such as recording and reproducing are performed after the dynamic range of an image is compressed.

As for such processing of compressing the dynamic range, there are a method in which the gradation (gray scale) of the whole image is corrected and a method in which the gradation of only the low frequency components of an image is corrected. In the former method, the dynamic range is compressed by a correction of the gradation such as a gamma correction, a knee correction and so-called histogram equalization. On the other hand, in the latter method, the dynamic range is compressed by a correction of the gradation such as the gamma correction and the knee correction.

However, there is a problem that these dynamic range compressing methods are not practically sufficient.

That is, by the method in which the gradation of the whole image is corrected by the gamma correction, the knee correction and the like, the contrast of an object as well as the dynamic range is compressed in a brightness region to be compressed, such as a brightness region including few highlight parts and histograms. Accordingly, the method has a problem that it is difficult to increase the compression rate of the dynamic range and a problem that an image having a low contrast and few variations is generated owing to the compression of the dynamic range.

On the other hand, in the method in which the gradation of only the low frequency components is corrected by the gamma correction, the knee correction and the like, a ratio of the low frequency components to the high frequency components of an image changes owing to the compression of the dynamic range. Owing to this change, the method has a problem that the edges of an image are unnaturally emphasized by the compression of the dynamic range and an image with degraded quality is generated.

SUMMARY OF THE INVENTION

The present invention was made in consideration of the aforesaid problems, and provides an image processing circuit or a method for processing an image, that may be used for various types of apparatus handling image data such as an imaging apparatus, an image display apparatus, an image data transmission apparatus.

The image processing circuit and method of the present invention are capable of compressing the dynamic range of an image while avoiding lowering of an impression concerning the contrast and unnatural edge emphasis of the image so as to compress the dynamic range of the image at a higher compression rate.

For solving such problems, according to a first aspect of the present invention, there is provided an image processing circuit or a method for processing an image, in which a pixel value of an input image is smoothed while preserving an edge of the input image and a gain correction coefficient is generated according to an output value of the smoothing processing to correct the pixel value of the input image.

According to the configuration of the first aspect, when the pixel value of the input image is smoothed while preserving the edge of the input image, only the component determining the dynamic range of the input image can be extracted from the input image separately. Accordingly, when the gain correction coefficient is generated according to the output value of the smoothing processing to correct the pixel value of the input image, the lowering of the contrast of an object that is independent of the dynamic range of the image and is desired to be preserved without compressing it is effectively evaded, and the dynamic range can be compressed at a desired compression rate. Moreover, because the lowering of the contrast of the object can be effectively evaded, the unnatural edge emphasis can also be prevented, and thereby the dynamic range of an input image can be compressed at a high compression rate while quality of the input image is maintained.

As described above, according to the present invention, a pixel value of an input image is smoothed while preserving an edge of the input image to obtain a gain correction coefficient, and the pixel value of the input image is corrected on the basis of the gain correction coefficient. Consequently, the lowering of an impression concerning the contrast and the unnatural edge emphasis of the image are effectively evaded, and it becomes possible to compress the dynamic range of the image at a higher compression rate.

BRIEF DESCRIPTION OF THE DRAWINGS

The above and other objects, features and advantages of the present invention will become more apparent from the following description of the presently preferred exemplary embodiments of the invention taken in conjunction with the accompanying drawings, in which:

FIG. 1 is an illustration showing equations 1;

FIG. 2 is an illustration showing equations 2;

FIG. 3 is an illustration showing equations 3;

FIG. 4 is a block diagram showing an image processing circuit according to a first embodiment of the present invention;

FIGS. 9A and 9B are timing charts for illustrating the operation of the non-linear smoothing unit shown in FIG. 8;

FIG. 10 is a timing chart for illustrating the operation of the improved ε filter of the non-linear smoothing unit shown in FIG. 8;

FIG. 15 is a block diagram showing an image processing circuit according to a second embodiment of the present invention;

FIG. 21 is a block diagram showing an image processing circuit according to a fifth embodiment of the present invention.

DESCRIPTION OF THE PREFERRED EMBODIMENTS

Hereinafter, the embodiments of the present invention will be described in detail by suitable reference to the attached drawings.

(1) Configuration of First Embodiment
(1-1) Whole Configuration of First Embodiment FIG. 4 is a block diagram showing an image processing circuit according to the first embodiment of the present invention. The present image processing circuit 1 is applied to an imaging apparatus such as a video camera and a digital camera, various image processing apparatus, image transmission apparatus, the image processing in a personal computer, and the like for compressing the dynamic range of an input image X to output an output image Y.

Incidentally, here, the input image X and the output image Y are two-dimensional digital images. Hereinafter, positions of a pixel in the horizontal direction and the vertical direction are designated by marks "i" and "j", respectively, and the pixel values of the input image X and the output image Y are designated by x(i, j) and y(i, j), respectively. Moreover, respective processed values corresponding to the pixel values x(i, j) and y(i, j) are similarly designated marks "i" and "j", respectively.

Figure 5A:
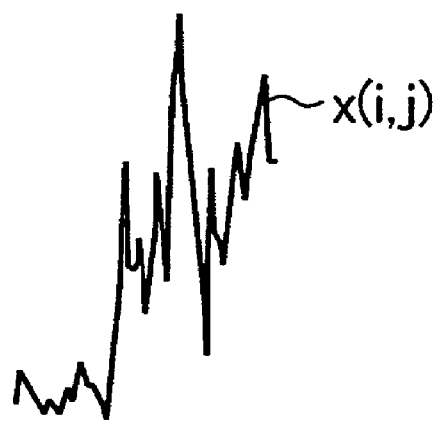
FIGS. 5A–5D are timing charts for illustrating the operation of the image processing circuit shown in FIG. 4.
Figure 5B:

In the image processing circuit 1, a non-linear smoothing unit 2 smoothes the pixel value x(i, j) of the input image X to be input into the non-linear smoothing unit 2 with a large dynamic range as shown in FIG. 5A, and outputs a smoothed image S based on a pixel value s(i, j) (shown in FIG. 5B). In the smoothing processing, the non-linear smoothing unit 2 performs the smoothing processing by judging whether each pixel value x(i, j) is at an edge or not on the basis of the pixel value information and spatial information of the input image X, and thereby the non-linear smoothing unit 2 performs only the smoothing processing of components having small amplitudes and does not perform the smoothing processing of edge components which may have large amplitudes. Consequently, the non-linear smoothing unit 2 smoothes the pixel value x(i, j) of the input image X while preserving the edge to take out only the component determining the dynamic range of the image X separately.

Figure 5C:

A look-up table (LUT) 3 outputs a gain correction coefficient g(i, j) (shown in FIG. 5C) for correcting the pixel value x(i, j) of the input image X on the basis of the pixel value s(i, j) of the smoothed image S output from the non-linear smoothing unit 2. The image processing circuit 1 corrects the pixel value x(i, j) of the input image X with the gain correction coefficient g(i, j) to compress the dynamic range. The look-up table 3 outputs the gain correction coefficient g(i, j) in conformity of the input-output characteristic thereof having, for example, a monotonically decreasing characteristic shown in FIG. 6. Incidentally, in the input-output characteristic shown in FIG. 6, when the pixel value s(i, j) of the smoothed image S is smaller than a prescribed value s1, the look-up table 3 outputs a gain correction coefficient g(i, j) of value 1.0. As the pixel value s(i, j) of the smoothed image S increases from the prescribed value s1, the gain correction coefficient g(i, j) decreases exponentially to be a value g1 at the max value $s_{max}$ of the pixel value s(i, j).

In accordance with such input-output characteristic, when the pixel value x(i, j) of the input image X rises before and after an edge with small variations of the pixel value, for example, as shown in FIG. 5A, the pixel value s(i, j) of the smoothed image S in which the small variations of the pixel value are eliminated is obtained. Then, the look-up table 3 outputs the gain correction coefficient g(i, j) (shown in FIG. 5C) that takes a smaller value when the pixel value s(i, j) takes a larger value. In this case, because the edge is preserved in the pixel value s(i, j) of the smoothed image S, the look-up table 3 outputs the gain correction coefficient g(i, j), the value of which rapidly varies at the edge part.

A delay circuit 4 delays image data constituting the input image X for an amount of time necessary for processing of the image data at the non-linear smoothing unit 2 and the look-up table 3. Thereby, the delay circuit 4 outputs the pixel value x(i, j) of the input image X at the adjusted timing with respect to the gain correction coefficient g(i, j) which is outputted from the look-up table 3.

A multiplier 5 multiplies the pixel value x(i, j) of the input image X output from the delay circuit 4 by the gain correction coefficient g(i, j) for correcting the pixel value x(i, j) of the input image X by the gain correction coefficient g(i, j) to output a pixel value z(i, j) for an image Z.

Figure 5D:
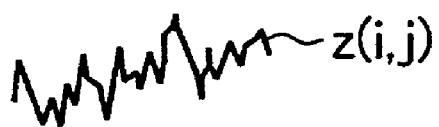

Now, because in the present embodiment the gain correction coefficient g(i, j) is set to be equal to a value of one or less, the multiplier 5 outputs the image Z having the pixel value z(i, j) that has the compressed dynamic range of that of the input image X as shown in FIG. 5D. Furthermore, because the gain correction coefficient g(i, j) having a value rapidly varying at the edge part owing to the smoothed image S, in which small variations are removed while the edge is preserved, is generated, the multiplier 5 generates the image Z, having the pixel value z(i, j), in which small variations of the pixel value of the input image X are preserved at the parts other than the edge part and only the variation of the pixel value at the edge part is compressed. That is, there is generated the image Z only the general dynamic range of which is selectively compressed.

Thereby, the present embodiment outputs the image Z the dynamic range of which is compressed at a high compression rate while evading effectively the lowering of an impression of the contrast owing to the compression of the small variations of pixel values and the unnatural edge emphasis owing to the variation of the frequency characteristic of an image.

Figure 7:
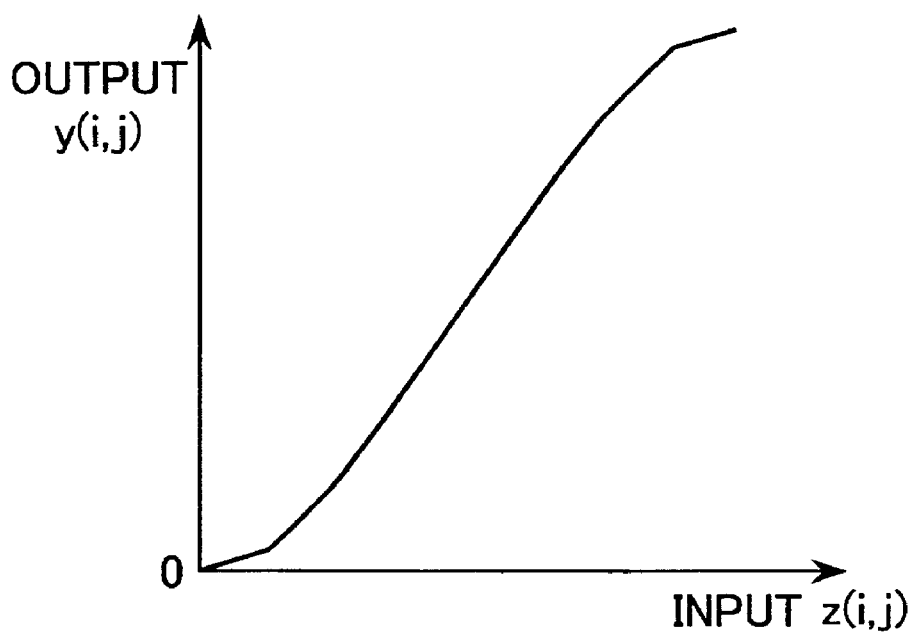
FIG. 7 is a characteristic curve diagram showing a characteristic of the lookup table 6 of the image processing circuit shown in FIG. 4.

A look-up table 6 finally sets characteristics of the image Z the dynamic range of which is compressed, and generates the output image Y. That is, an input-output characteristic of the look-up table 6 is set so as to compress gradations near to black and to white as shown in FIG. 7. Thereby, the look-up table 6 prevents saturation of gradation at a part of the dynamic range of the image data output from the multiplier 5 that exceeds the dynamic range of the output image Y, and can effectively evade a situation that gradations of the output image Y near to black and to white are lost.

(1-2) Non-linear Smoothing Unit

Figure 8:
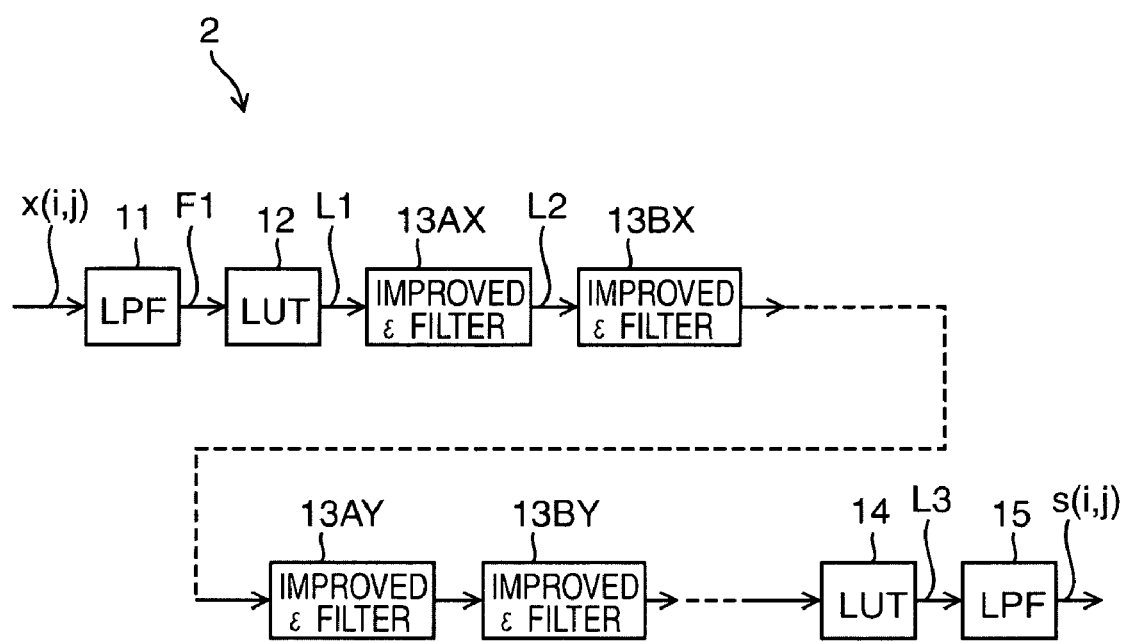
FIG. 8 is a block diagram showing the non-linear smoothing unit of the image processing circuit shown in FIG. 4.

FIG. 8 is a block diagram showing a configuration of a non-linear smoothing unit 2. In the non-linear smoothing unit 2, a two-dimensional linear lowpass filter (LPF) is used as the lowpass filter 11 for smoothing the input image X. The generation of noise in a shape of a point at the following processing is prevented by the smoothing processing of the pixel value x(i, j) of the input image X in advance to some extent. Incidentally, by the use of one-dimensional linear lowpass filters in the horizontal direction and the vertical direction of the input image X severally as the lowpass filter 11, the similar processing can be performed.

A look-up table 12 performs a logarithmic transformation of the pixel value of image data F1 output from the lowpass filter 11 so as to output the logarithmically transformed data, and thereby the logarithmically transformed pixel value is smoothed in the following processing lest the degree of the smoothing differs with the pixel value.

An improved $\epsilon$ filter 13AX is a filter that has been changed a part of a non-linear smoothing filter called as an $\epsilon$ filter. The improved $\epsilon$ filter 13AX smoothes pixel values of the input image L1 input by the look-up table 12 while preserving edges in the horizontal direction of the image L1 to output the smoothed pixel value.

A successive improved $\epsilon$ filter 13BX is a non-linear smoothing filter like the improved $\epsilon$ filter 13AX, and smoothes the pixel value of the input image L2 input by the improved $\epsilon$ filter 13AX while preserving edges in the horizontal direction of the image L2 to output the smoothed pixel value. The improved $\epsilon$ filter 13BX has a delay time, which will be described later, different from that of the improved $\epsilon$ filter 13AX, and thereby has a sampling pitch for the smoothing processing different from that of the improved $\epsilon$ filter 13AX. The other features of the improved $\epsilon$ filter 13BX are the same as those of the improved $\epsilon$ filter 13AX.

The non-linear smoothing unit 2 has a prescribed number of stages of such improved $\epsilon$ filters having a sampling pitch different from each other for the smoothing processing in a serial connection disposition. Thereby, the non-linear smoothing unit 2 performs the smoothing processing for each frequency component of the pixel value corresponding to each sampling pitch, and thereby the non-linear smoothing unit 2 performs the sufficient smoothing processing over a substantially wide frequency range with respect to the total frequency band.

Improved $\epsilon$ filters 13AY, 13BY . . . have configurations similar to those of the improved $\epsilon$ filters 13AX, 13BX, . . . except the point that the improved $\epsilon$ filters 13AY, 13BY, . . . performs the smoothing processing in the vertical direction. Accordingly, the improved $\epsilon$ filter 13AY, which is the first stage of the improved $\epsilon$ filter 13AY, 13BY, . . . , is configured so that the image data is changed in its arrangement by the use of a memory not shown in the figure and is input to the improved $\epsilon$ filter 13AY. By the aforesaid configuration, the non-linear smoothing unit 2 performs the smoothing processing of the input image in its horizontal direction and its vertical direction over a wide frequency band while preserving the edge thereof.

A look-up table 14 performs the inverse logarithmic transformation of the image data that was smoothed by the improved $\epsilon$ filters 13AY, 13BY, . . . , conversely to the look-up table 12, and outputs the transformed data. A lowpass filter 15 is a linear lowpass filter like the lowpass filter 11, and slightly dulls the edge of the output image L3 output from the look-up table 14 that was smoothed while preserving the edge. Thereby, a part in the vicinity of the edge of the output image Y is smoothed so that occurrence of unnatural feeling resulted by a series of the processing may be obstructed.

(1-2-1) Improved $\epsilon$ Filter

Because the improved $\epsilon$ filter 13AX is a filter that modified a part of the configuration of the general $\epsilon$ filter, a configuration of the improved $\epsilon$ filter 13AX will be described in contradistinction to an $\epsilon$ filter in the following. Incidentally, because the configuration of the improved $\epsilon$ filter 13BX, . . . is the same as that of the improved $\epsilon$ filter 13AX except that their sampling pitches for the smoothing processing differ from each other, parts concerning the different configuration are suitably described here and a duplicate description is omitted. Moreover, the configurations of the improved $\epsilon$ filters 13AY, 13BY, . . . are the same as those of the improved $\epsilon$ filters 13AX, 13BX, . . . except that an order of the image data to be processed is different, the duplicate description is also omitted.

An input-output characteristic of an ordinary one-dimensional $\epsilon$ filter having 2N+1 taps can be expressed by equation 1 shown in FIG. 1, where $s_n$ indicates an output value; $r_n$ indicates an input value; $\epsilon$ indicates a prescribed reference value; $r_n$ indicates the input value of the center of an object to be processed; and $a_k$ indicates a weighting coefficient. Moreover, a range of summation (sigma) in the second formula in the equation 1 is from k=−N to k=N.

Thereby, when the output value $s_n$ of a pixel $p_n$ having a pixel value $r_n$ is computed, as shown in FIG. 9A, a weighting addition processing is performed as follows: that is, as to the pixel $p_{n-k}$ at which the absolute value of the difference between the central pixel value $r_n$ and the pixel value of the pixel $p_{n-k}$ $r_n-r_{n-k}$ is larger than the reference value $\epsilon$ among the pixels $p_1-p_{2N+1}$ being objects of the computation processing, the pixel value $r_{n-k}$ is replaced with the central pixel value $r_n$. Moreover, as to the pixel $p_{n-k}$ at which the absolute value of the difference of the pixel values $r_n-r_{n-k}$ is equal to or less than the reference value $\epsilon$, the pixel value $r_{n-k}$ of the pixel $p_{n-k}$ is used.

That is, as shown in FIG. 9A, when the output value $s_n$ of a pixel $P_n$ is computed by the $\epsilon$ filter, the value $s_n$ is computed by the replacement of the pixel value $r_m$ of a pixel $p_m$ at which the pixel value $r_m$ differs from that of the pixel $P_n$ in an extent larger than the reference value $\epsilon$ as the judgment reference among the before and the behind of the pixel $P_n$ with the pixel value $r_n$. Thereby, as shown in FIG. 9B, the small variations of the pixel values are suppressed while the edge is preserved in comparison with the processing of a plain linear lowpass filter.

However, in this method, because the pixel value is judged on the basis of the reference value $\epsilon$ with the value $r_n$ of the pixel $P_n$ the output value of which is computed as the center, and then the output value $s_n$ is computed by the weighting addition by means of the replacement of the pixel value with the pixel value $r_n$ of the pixel $P_n$. Accordingly, the small variations of the pixel value can be suppressed while the edge is preserved when the pixel value x varies at almost constant direct current level like both the sides of the edge shown in FIG. 9A. However, it becomes difficult to smooth the pixel value sufficiently when the direct current level varies as shown in FIG. 10.

That is, when a direct current level of an input value r increases or decreases gradually, the more a pixel becomes distant from the pixel $P_n$ at which output value $s_n$ is computed, the less the number of the pixels included in a region set on the reference value $\epsilon$ becomes. Moreover, in this case, even if the weighting addition by the replacement of the value $r_n$ of the pixel $P_n$, the smoothing processing may not be performed on the reflection of the variations of the direct current level correctly.

Accordingly, in the present embodiment, as shown by the following equation in contradistinction to the equation 1 shown in FIG. 1, the variation of the direct current level is approximated by a certain function, and a region (2$\epsilon$1) is set by means of the function around the pixel value $r_n$ of the pixel $P_n$ for the judgment of a pixel value. Moreover, as for a pixel out of the region, the pixel value is replaced with a pixel value on the function for performing the smoothing processing. Incidentally, here, a range of the sigma in the second formula in equation 2 shown in FIG. 2 is k=−N to k=N, and a range of the sigma of the second formula in equation 3 is s=−M to s=M−1.

Here, the linear function is applied as the aforesaid function, and the variations of the direct current level are processed by linear approximation. That is, an averaged value $K_a$ of the inclinations of straight lines connecting adjoining pixels among 2M pixels before and behind a pixel at which the output value $s_n$ is computed. And then, a region is set on the basis of the averaged value $K_a$ of the inclinations to judge a pixel value, and further pixel values are replaced to be situated on the straight line. Thereby, the present embodiment can perform the smoothing processing while preserving the edge with much better reliability in comparison with the prior art. Incidentally, a case where the average value $K_a$ of the improved $\epsilon$ filter is set to zero is the characteristic of a general $\epsilon$ filter described with regard to FIG. 9.

Figure 11:
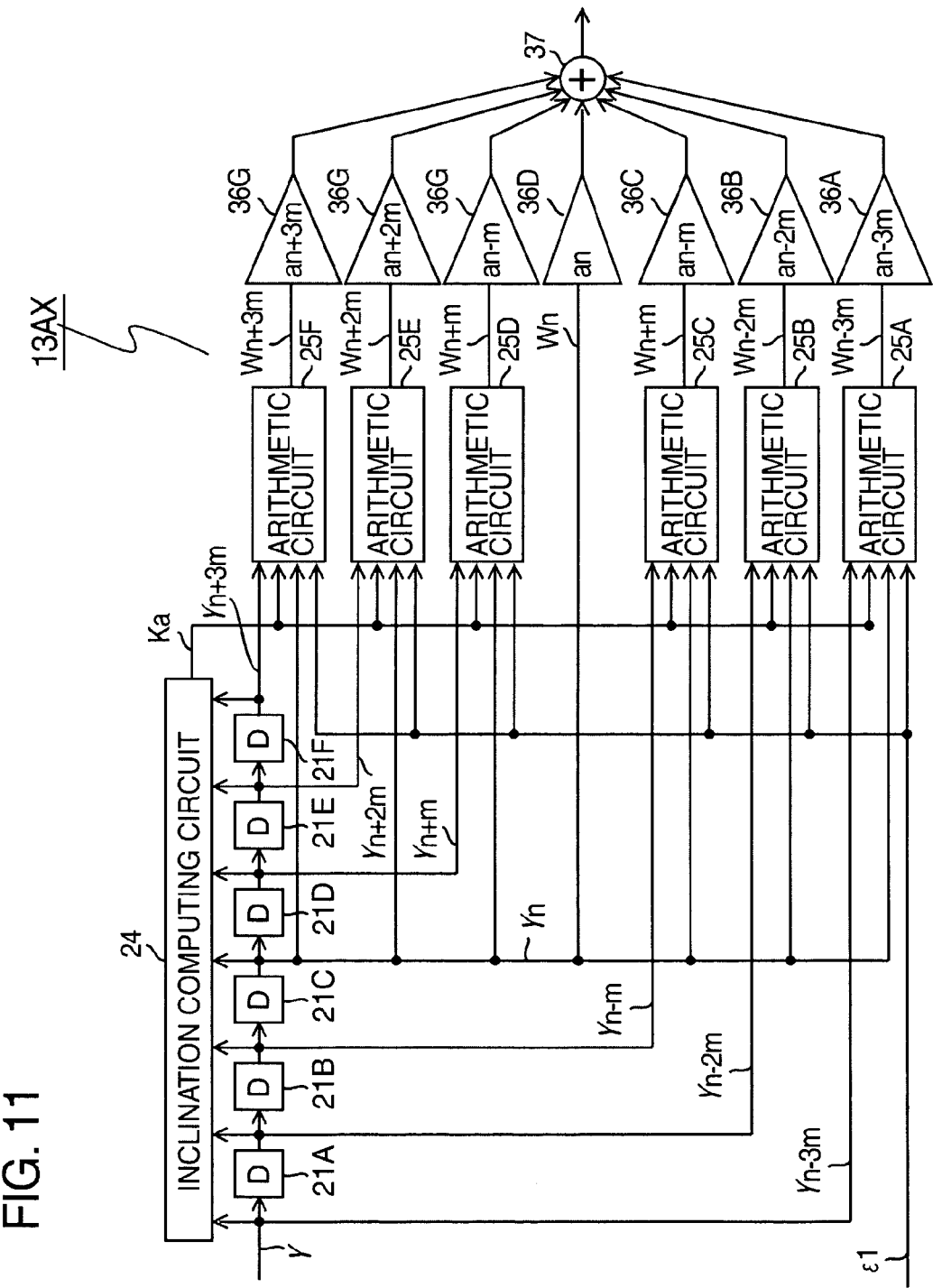
FIG. 11 is a block diagram showing the improved ε filter of the non-linear smoothing unit shown in FIG. 8.
Figure 12:
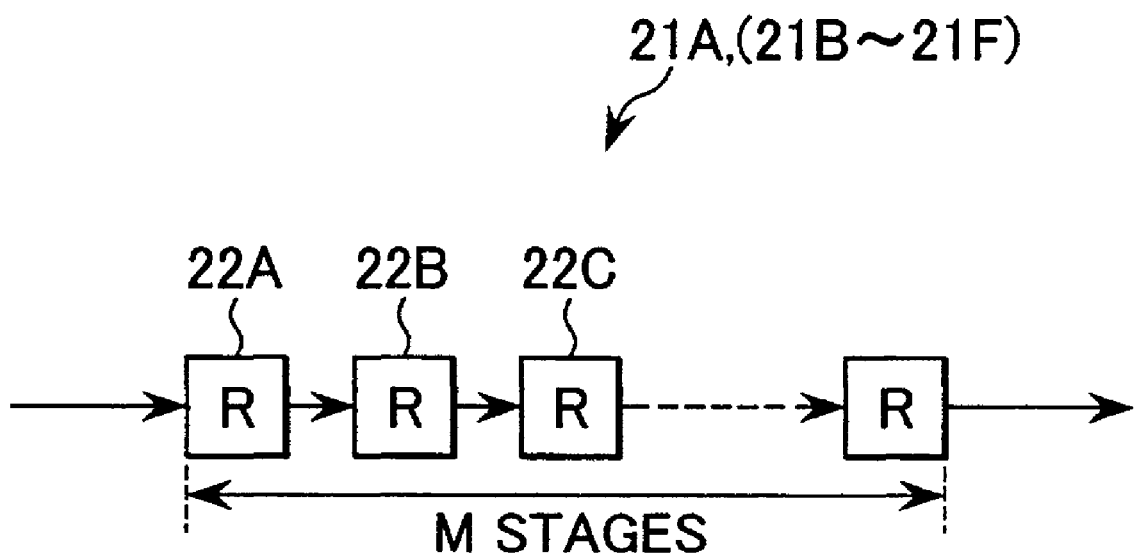
FIG. 12 is a block diagram showing the delay circuit of the improved ε filter shown in FIG. 11.

FIG. 11 is a block diagram showing the improved $\epsilon$ filter 13AX. In the improved $\epsilon$ filter 13AX, a pixel value r to be smoothed is input in turn into delay circuits (D) 21A–21F having a prescribed delay time, and the improved $\epsilon$ filter in this example is configured to have seven taps. Now, the delay circuits 21A–21F are constituted of a prescribed number of stages (m stages) of registers 22A–22N connected in series as shown in FIG. 12. Hereby, the improved $\epsilon$ filter 13AX can select seven samples of the pixel value r(i, j) at the sampling pitch corresponding to the number of stages of the register train 22A–22N (namely, corresponding to the delay times of the delay circuits 21A–21F).

The improved $\epsilon$ filter 13AX performs its processing by selecting pixel value r according to the sampling pitch corresponding to the number of stages of the registers 22A–22N, and thereby the improved $\epsilon$ filter 13AX performs its smoothing processing by using a wide extent of pixel values to that degree before and behind the pixel the output value of which is to be computed. Thereby, the processing at the following stages is simplified correspondingly to the wide extent. Incidentally, if the smoothing processing is performed by the use of pixel values in such a wide extent, the variations of the pixel values owing to the low frequencies can be sufficiently suppressed to that degree.

Incidentally, the improved $\epsilon$ filter 13BX, . . . are configured to have registers the number of stages of which is different from that of the improved $\epsilon$ filter 13AX, and are configured so that the delay times of the corresponding delay circuits 21A–21F are different from those of the improved $\epsilon$ filter 13AX. Thereby, the improved $\epsilon$ filter 13BX, . . . are configured to perform their smoothing processing in accordance with the frequency characteristics different from those of the improved $\epsilon$ filter 13AX.

To the inclination computing circuit 24 (shown in FIG. 11), a pixel value input into the first stage delay circuit 21A is input together with the output values from the delay circuits 21A–21F, and then seven sampled r(i, j) corresponding to the delay times of the delay circuits 21A–21F are input. An inclination computing circuit 24 executes a computation processing of equation 3 shown in FIG. 3 to compute the averaged value $K_a$ of the inclination for outputting it.

Arithmetic operation circuits 25A–25F perform computation processing of the third formula and the fourth formula in the equation 2 shown in FIG. 2 with regard to the outputs of each tap $r_{n-3m}, r_{n-2m}, r_{n-m}, r_{n+m}, r_{n+2m}, r_{n+3m}$ among pixel values at the seven tap output from the delay circuits 21A–21F except the output value $r_n$ of the center tap, respectively, and output the processing results $w_{n-3m}, w_{n-2m}, w_{n-m}, w_{n+m}, w_{n+2m}, w_{n+3m}$, respectively. Incidentally, here, m indicates the number of stages of the registers in the delay circuits 21A–21F.

Figure 13:
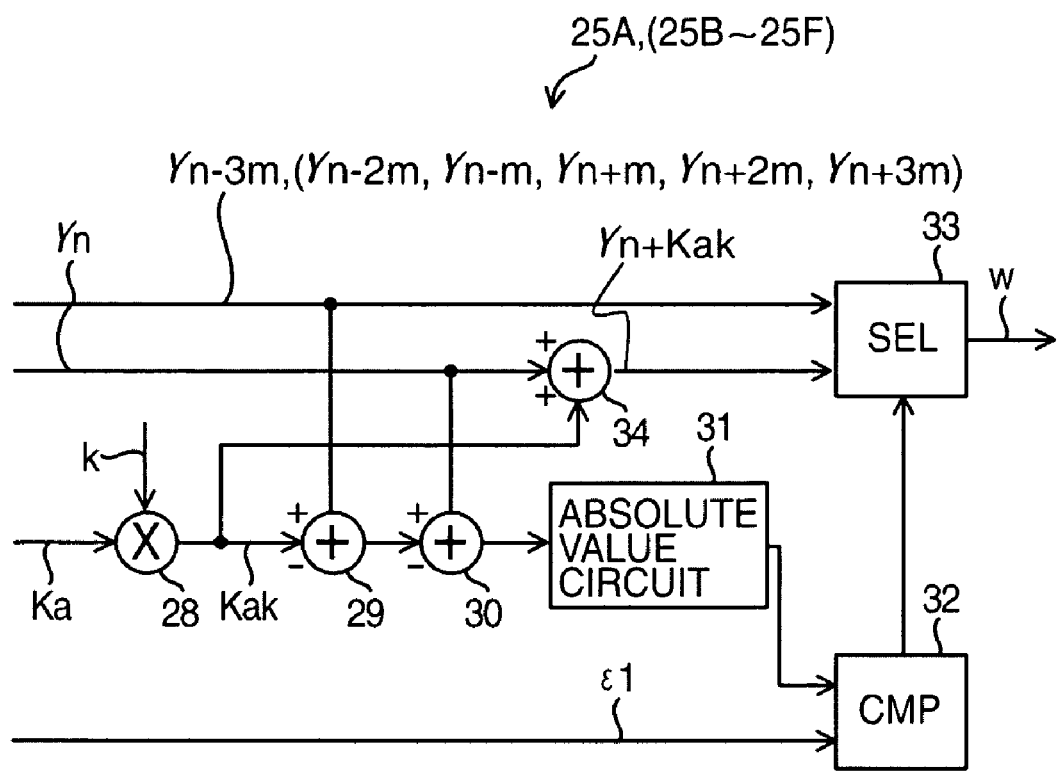
FIG. 13 is a block diagram showing the arithmetic operation circuit of the improved ε filter shown in FIG. 11.

That is, in the arithmetic operation circuit 25A (25B–25F), as shown in FIG. 13, the averaged value $K_a$ of the inclination is input to a multiplier 28, and the multiplier 28 multiplies the input average value $K_a$ by the distance k from the center tap corresponding to each tap output $r_{n-3m}, r_{n-2m}, r_{n-m}, r_{n+m}, r_{n+2m}, r_{n+3m}$, severally, and thereby the deviation $K_a \cdot k$ at the sampling point of each tap output $r_{n-3m}, r_{n-2m}, r_{n-m}, r_{n+m}, r_{n+2m}, r_{n+3m}$ from the center tap output $r_n$ is computed in accordance with the linear function of the average value $K_a$ of the inclinations (see equations 2 and 3).

A subtracter 29 computes the $v_{n-k}$ in the equation 2 by subtracting the output value $K_a \cdot k$ of the multiplier 28 from each tap $r_{n-3m}, r_{n-2m}, r_{n-m}, r_{n+m}, r_{n+2m}, r_{n+3m}$ to output A subtracter 30 computes the $(r_n-v_{n-k})$ in the equation 2 by subtracting the output value $v_{n-k}$ of the subtracter 29 from the center tap output $r_n$, and output the result.

The absolute value circuit 31 computes the $r_n-v_{n-k}$ in the equation 2 by taking the absolute value of the output value $(r_n-v_{n-k})$ of the subtracter 30, and outputs the results.

A comparator (CMP) 32 performs a largeness judgment processing in the equation 2 by comparing the output value $r_n-v_{n-k}$ of an absolute value circuit 31 with the reference value $\epsilon$1 for the region setting mentioned above with regard to FIG. 10, and outputs the judgment result in term of a switching signal for a selector (SEL) 33.

An adder 34 computes the $r_n+K_a \cdot k$ in the equation 2 by adding the center tap output $r_n$ and the output value $K_a \cdot k$ of the multiplier 28, and outputs the results.

The selector 33 selectively outputs each tap output $r_{n-3m}, r_{n-2m}, r_{n-m}, r_{n+m}, r_{n+2m}, r_{n+3m}$ or the output value $r_n+K_a \cdot k$ of the adder 34 in accordance with the switching signals SEL output from the comparator 32.

By the aforesaid configuration, the arithmetic operation circuit 25A adjusts a linear function of the inclination computed by the inclination computing circuit 24 so as to pass the position of the pixel value $r_n$ of the pixel $P_n$ at which the output value is computed, and sets a region having a value $\epsilon$1 on the upper and lower sides of the disposed straight line. Then, a pixel the pixel value of which protrudes from the region is judged to be the edge and the pixel value is replaced with a pixel value on the straight line, and as to a pixel in the region, the computing result based on the original pixel value of the pixel is output.

Weighting circuits 36A–36G shown in FIG. 11 perform weighting processing of the output values from the arithmetic operation circuits 25A–25F or the output value from the center tap by the use of weighting coefficients corresponding to each tap and output the results, respectively, and thereby executes the computation processing of each term of the sigma in the first formula in the equation 2.

An adder 37 adds the output values from these weighting circuits 36A–36G, and thereby executes the computation processing of the first formula in the equation 2, and outputs the processing result.

(1-2-2) Lookup Table 3

Figure 14:
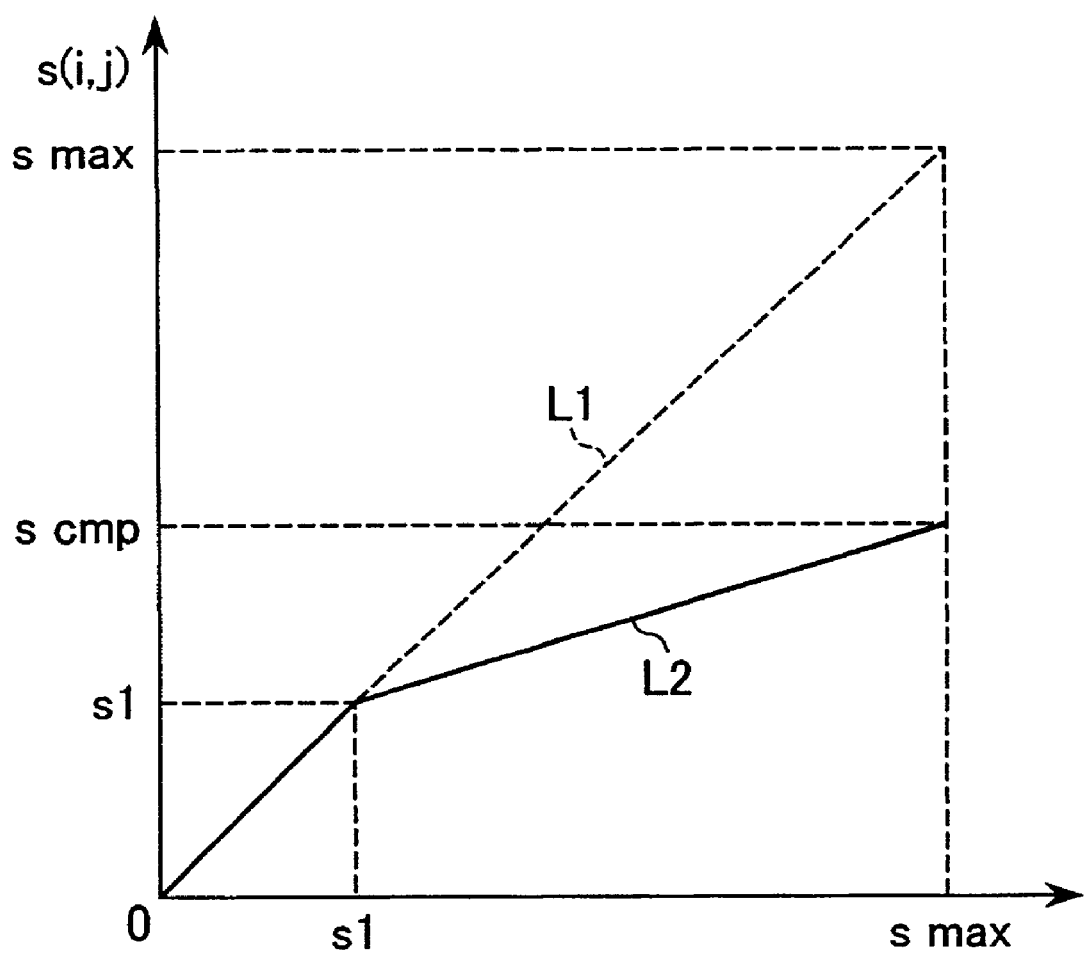
FIG. 14 is a characteristic curve diagram for illustrating a characteristic of the lookup table 3 of the image processing circuit shown in FIG. 4.

Now, FIG. 14 is a characteristic curve diagram showing the gradation conversion characteristic of a low frequency component of the image processing circuit 1. The input-output characteristic of the lookup table 3 is set by the gradation conversion characteristic shown in FIG. 14.

That is, when a pixel value $s_{max}$ that is the largest value in the low frequency component is input into the image processing circuit 1, the corresponding output value is set to $s_{cmp}$ in accordance with a characteristic curve designated by mark L2. In this case, the compression rate g1 of the dynamic range is expressed by $s_{cmp}/s_{max}$. As shown by the characteristic curve designated by the mark L2, in an extent up to the pixel value s1 of the low frequency component, output values generated from input values by a gain of one are output. Incidentally, the pixel value s1 is smaller than the upper limit of the dynamic range of the output image, and the pixel values having values equal to or smaller than the value s1 in the input image X are considered as not necessary to compress the gradation of the pixel value.

The look-up table 3 divides each value on the ordinate axis by the conversion characteristic curve having a gain one and being designated by the mark L1 that is the conversion characteristic curve up to the pixel value s1, and the input-output characteristic is set by the operation expressed by L2/L1.

(2) Operation of First Embodiment

In the aforesaid configuration, in the image processing circuit 1 (FIG. 4), the input image X, which is an photographed result or the like, is input into the non-linear smoothing unit 2 (FIG. 5A and FIG. 5B), and the input image X is processed to be smoothed while the edge thereof is preserved by the non-linear smoothing unit 2, and thereby the smoothed image S is generated. Because the smoothed image S is here processed to be smoothed while the edge thereof is preserved, the components that determine the contrast of the object and are desired to be preserved without being compressed and further are independent of the dynamic range of the image are removed, and only the components that determine the dynamic range of the image are separately taken out.

In the image processing circuit 1, by the access of the look-up table 3 by means of the smoothed image S, the gain correction coefficients g(i, j) are generated in sequence (FIG. 5C and FIG. 6), and the pixel value x(i, j) of the input image X input through the delay circuit 4 is multiplied by the multiplier 5 to compress the dynamic range of the input image X (FIG. 5D). At this time, the pixel value x(i, j) of the input image X is corrected by the gain correction coefficient g(i, j) of the smoothed image S being only the component to determine the dynamic range of the image, and consequently, only the variations of the pixel value as the whole are selectively compressed and generated while the localized variations of the pixel value and the edge of the image are preserved. Thereby, the image Z in which the deterioration of the contrast feeling that is a contrast to look at is evaded and the dynamic range thereof is fully compressed is generated. Moreover, as for the edge, the change of the frequency characteristic is also prevented, and thereby the unnatural emphasis of the edge is prevented.

In the image processing circuit 1, by the access to the look-up table 6 by the pixel value of the image Z the dynamic range of which was thus compressed (FIG. 4 and FIG. 7), the gradations in the vicinity of black and white are selectively compressed, and thereby output image Y is output while evading effectively the situation in which the gradations in the vicinity of black and white are lost even if the input image X having an extremely large dynamic range is input.

Accordingly, for example, an imaging apparatus such as a video camera and an electronic still camera using the image processing circuit 1 may enable to prevent deterioration in the quality of the imaged result by performing the recording and the reproducing of the imaged results with its recording and reproducing system having a narrower dynamic range than that of the imaged result. Incidentally, in the imaging apparatus, such an imaged result wider in the dynamic range than an ordinal case may be obtained by the selection of the image pickup device, the synthesis of the image data with different sensitivity and so on. Moreover, when an image data having such a wider dynamic range is displayed by the application to an image displaying apparatus in accordance with the present embodiment, a high quality image may be displayed.

Moreover, even if an image having a wide dynamic range is variously processed by the application of the image processing circuit 1 to the image correction such as the backlight correction, and the image synthesis and the image processing using a computer, the result of the processing can be transmitted, recorded and reproduced without the deterioration of the quality of the image. Thereby, such various processing can also be performed in high quality. Moreover, when the image processing apparatus is applied to an image transmission apparatus, an image can be transmitted at a high speed with the effective evasion of the deterioration of image quality.

When the image processing circuit smoothing a pixel value while preserving the edge component, the non-linear smoothing unit 2 (shown in FIG. 8) of the image processing circuit 1 limits a band width of the pixel value x(i, j) of the input image X with the lowpass filter 11, and then performs the smoothing processing while preserving the edge of the input image X with the improved ε filters 13AX, . . . , and consequently the generation of noise in a shape of a point in an output image Y may be prevented.

Moreover, by setting a band limitation in the smoothed image S at the last stage low pass filter of the non-linear smoothing unit 2, the unnatural variations of a pixel value near to the edge may be lowered, and thereby there may be obtained an output image Y in which the vicinity of its edge is expressed smoothly.

Moreover, after the logarithmic transformation of the pixel value x(i, j) by the look-up table 12 and the execution of the smoothing processing while preserving the edge, the smoothed image S is generated by the inverse logarithmic transformation by the look-up table 14, and thereby mutual differences between the smoothing processing results in the pixel values may be prevented, and the unnatural compression of the dynamic range of the output image Y may be prevented.

Moreover, the filtering processing of the input image that suppresses the high frequency components thereof while preserving the edge thereof is successively performed by the improved $\epsilon$ filters 13AX, 13BX, . . . in the horizontal direction, and then the similar processing is performed by the successive improved $\epsilon$ filters 13AY, 13BY, . . . in the vertical direction. Thereby, it becomes possible to generate the output image Y that secures a sufficient contrast feeling in the vertical direction, the horizontal direction and further oblique directions, and prevents the unnaturalness of the edge.

Moreover, the improved $\epsilon$ filters 13AX, 13BX, . . . , 13AY, 13BY, . . . perform the filtering processing, in which the edge is preserved in each direction, repeatedly at different sampling pitches, and thereby the image processing circuit 1 can generate the smoothed image S that is sufficiently smoothed in a wide frequency band while the edge information thereof is preserved. Consequently, the image processing circuit 1 can execute the smoothing processing so that only a specific frequency component is selectively left in such a smoothed image S, and the deterioration of the image quality of the output image Y can effectively be evaded in that degree.

In each improved $\epsilon$ filter 13AX, 13BX, . . . , 13AY, 13BY, . . . (FIG. 10 and FIG. 11), the pixel value r is input in sequence into the delay circuits 21A–21F connected to each other in series, each tap output value other than the center tap output is judged by the arithmetic operation circuits 25A–25F severally on the basis of the center tap output among the seven tap outputs from the delay circuits 21A–21F (FIG. 13). Moreover, when a pixel value greatly differs from the center tap output, the pixel value is judged to cross over an edge, the pixel value different greatly is replaced with a prescribed value. Thus the weighting addition of the center tap output and the other tap outputs is performed by the weighting circuits 36A–36F and the adder 37 whereby performing the smoothing processing.

In the processing, because in each improved $\epsilon$ filter 13AX, 13BX, . . . , 13AY, 13BY, . . . , each delay circuit 21A–21F is configured by a serial circuit of the registers 22A–22N, the smoothing processing is executed by the sampling of the continuous pixel values at a pitch of the number of the registers connected in series. Accordingly, the smoothing processing can be executed by arranging the number of the arithmetic operation circuits 25A–25F, the weighting circuits 36A–36F and the adder 37 correspondingly to the tap outputs, and thereby the whole configuration thereof can be simplified in that degree. Moreover, as to the pixel value that is an object of the smoothing processing, the smoothing processing can be performed by the use of the pixel values in a wider extent in comparison with the configurations of the arithmetic operation circuits 25A–25F, the weighting circuits 36A–36F, and the adder 37, and thereby, for example, pulsing variations having a low frequency can sufficiently be smoothed.

Because in the image processing circuit 1, each improved $\epsilon$ filter 13AX, 13BX, . . . , 13AY, 13BY, . . . is designed so that the number of stages of the resisters 22A–22N constituting the delay circuits 21A–21F differs from each other, as mentioned above, the filtering processing is repeatedly executed at different sampling pitches, and consequently, the deterioration of the image quality of the output image Y can be prevented.

In such processing of replacing the pixel value by performing the edge judgment based on the center tap output, in each improved $\epsilon$ filter 13AX, 13BX, . . . , 13AY, 13BY, . . . , the low frequency component of each tap output is approximated to a prescribed function, and a region ($2\epsilon 1$) is set by the function on the basis of the center tap output (FIG. 10), and then the edge is judged whether the pixel value belongs to the region or not. Thereby, each improved $\epsilon$ filter 13AX, 13BX, . . . , 13AY, 13BY, . . . can judge the edge similarly in a case where the pixel values have no increase or decrease inclination even if the pixel values have the gradual increase inclination or the gradual decrease inclination. Consequently, the deterioration of the output image Y owing to the variation of such judgment can be prevented.

Moreover, in a case where a pixel value is replaced by the judgment of that the pixel is at the edge part, the pixel value to be replaced is determined on the basis of the function obtained in such a way. Accordingly, the variations of the pixel value at such a low frequency are reflected to the weighting processing, and thus it becomes possible to make the output image having far higher quality.

Moreover, in the present embodiment, a series of processing can be executed by the simple configuration such that a straight line inclination is obtained by the application of the linear function as the function, and further that the processing of the judgment and so on are executed by using the straight line inclination obtained.

That is, in each improved $\epsilon$ filter 13AX, 13BX, . . . , 13AY, 13BY, . . . , the inclination computing circuit 24 computes differential values between adjoining tap outputs among the seven tap outputs, and computes the averaged value $K_a$ of the inclination from the averaged value of the differential values. Moreover, in each arithmetic operation circuit 25A–25F, at the sampling positions of tap outputs other than the center tap, the differential value $K_a \cdot k$ from the center tap output at the inclination is computed by the multiplier 28 on the basis of the averaged value $K_a$ of the inclination and the distance k from the center tap position. And then, the successive subtracters 29, 30 compute the differential value between the pixel value on the function of the inclination $K_a$ and the actual pixel value of the tap output, and the comparator 32 judges whether the differential value is larger than the reference value $\epsilon 1$ or not. The judgment processing to judge whether or not the pixel is an edge by using an approximate function comprising the linear function is consequently executed.

Furthermore, on the other hand, the adder 34 computes the pixel value on the function of the inclination $K_a$, and any one of the actual tap output and the pixel value on the function that was thus computed is selected to be output according to the judgment result by the comparator 32. Consequently, the pixel value of the pixel crossing the edge is replaced with the pixel value computed by using the approximate function comprising the linear function, and then each tap output is output to the corresponding weighting circuit.

Accordingly, as to the input image X having various image qualities in wide dynamic ranges, the image processing circuit 1 can compress the dynamic range sufficiently while preventing the deterioration of the edge and the lowering of the contrast sense.

(3) Effect of First Embodiment

According to the aforesaid embodiment, the input image X is smoothed while the edge thereof is preserved, and the gain correction coefficient g is obtained to correct the pixel value of the input image by means of the obtained gain correction coefficient g. Consequently, the dynamic range of the image can be compressed at a higher compression rate while the lowering of an impression concerning the contrast and the unnatural edge emphasis of the input image are effectively evaded.

Moreover, after the dynamic range was thus compressed, further the gradation is corrected by the look-up table 6, and thereby the loss of the gradation in the vicinity of black and in the vicinity of white can effectively be evaded.

Moreover, when the input image X is thus smoothed while the edge thereof is preserved, after the band limitation with the lowpass filter, the processing of the logarithmic transformation is performed. Moreover, the inverse logarithmic transformation of the result of the logarithmic transformation processing is performed, and thereby the generation of noise in a shape of a point is prevented, and further the mutual differences between the smoothing processing results in pixel values can be prevented.

Moreover, when the input image X is smoothed while the edge thereof is preserved, a plurality of filtering processing with the sampling pitches which are different from each other are repeated, and then a uniform smoothing processing in the wide frequency band can be performed. Accordingly, the output image Y having high quality can be output.

Moreover, by performing the smoothing processing by the sampling of a continuing pixels at a prescribed pitch, the smoothing processing of a wide extent pixel values can be executed with a simple configuration, and thereby the smoothing processing for a low frequency is also fully performed to make it possible to obtain a high quality output image Y.

Moreover, by the approximation of a function in accordance with the pixel values to set a region on the basis of the function for the judgment of the edge in the smoothing processing, and further by the computation of the pixel value to be replaced by means of the function, a high quality output image Y can be obtained.

Furthermore, by using a linear function for the function, the configuration as a whole may be simplified.

(4) Second Embodiment

FIG. 15 is a block diagram showing an image processing circuit according to a second embodiment of the present invention in comparison with the first embodiment shown in FIG. 4. In the image processing circuit 41, the identical constitutional components to those of the image processing circuit 1 are designated by corresponding marks, and the overlapping description of them is omitted.

The image processing circuit 41, like the image processing circuit 1, as shown in FIGS. 16A–16F, smoothes the input image X (FIG. 16A) constituted of the pixel value x(i, j) to generate a smoothed image S (FIG. 16B), and compress the dynamic range of the input image X by the gain correction coefficient g(i, j) (FIG. 16C) generated by the pixel value s(i, j) of the smoothed image S. In the processing, the image processing circuit 41 emphasizes the variations of the pixel value y(i, j) of the output image Y by using the subtraction value x(i, j)–s(i, j) which is obtained by subtracting the output value s(i, j) in the smoothing processing from the pixel value x(i, j) of the input image X.

Figure 16A:
FIGS. 16A–16F are time charts for illustrating the operation of the image processing circuit shown in FIG. 15.
Figure 16B:
Figure 16C:
Figure 16D:
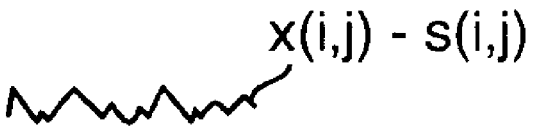
Figure 16E:
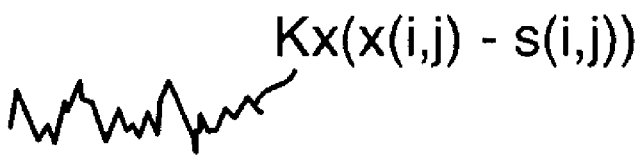
Figure 16F:

That is, in the image processing circuit 41, the subtracter 42, the multiplier 43, the adder 44 are arranged in order between the delay circuit 4 and the multiplier 5. Here, the subtracter 42 subtracts the output value s(i, j) by the smoothing processing from the pixel value x(i, j) of the input image X to output the subtracted value x(i, j)–s(i, j) (FIG. 16D). The next multiplier 43 amplifies the subtracted value x(i, j)–s(i, j) by a prescribed gain K (FIG. 16E), and the adder 44 adds the pixel value s(i, j) of the smoothed image S to the output value of the multiplier 43. Thus, the image processing circuit 41 multiplies the result of the addition of the adder 44, that emphasizes small pulsing variations to be eliminated by the non-linear smoothing unit 2 in comparison with the input image X, with the multiplier 5 to generate the output image Y. Consequently, the image processing circuit 41 is configured so as to output the so-called sharper image in comparison with the image processing circuit 1 described above with regard to FIG. 4 to the extent that such small pulsing variations are emphasized.

According to the configuration shown in FIG. 15, by the emphasis of the variations of the pixel values y(i, j) by the use of the subtracted value x(i, j)–s(i, j) obtained by the subtraction of the output value s(i, j) in the smoothing processing from the pixel value x(i, j) of the input image X, further sharper image can be output in addition to the effects of the first embodiment.

(5) Third Embodiment

Figure 17:
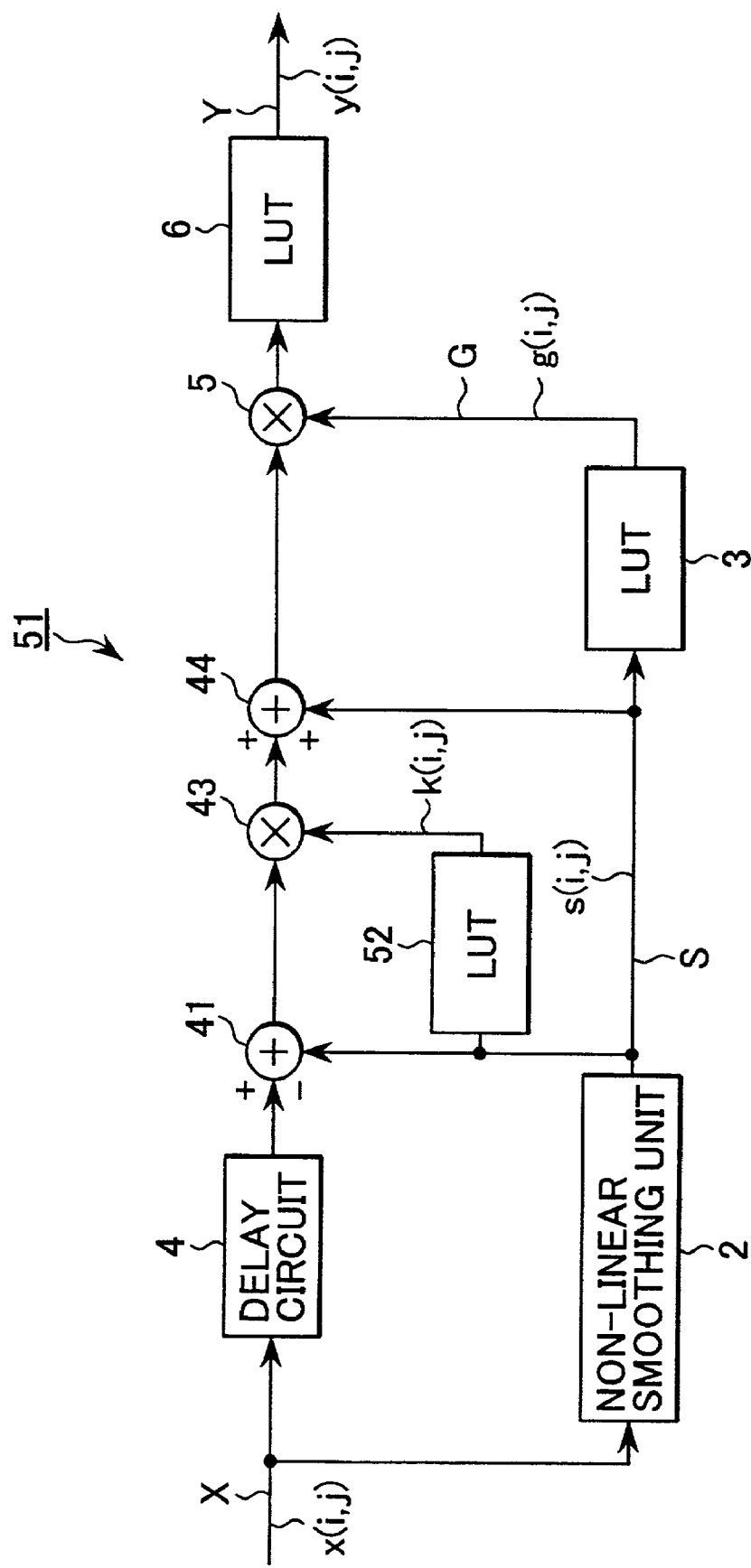
FIG. 17 is a block diagram showing an image processing circuit according to a third embodiment of the present invention.

FIG. 17 is a block diagram showing an image processing circuit 51 in accordance with a third embodiment of the present invention in comparison with the embodiment shown in FIG. 15. In the image processing circuit 51, the identical constitutional components to those of the image processing circuit 41 are designated by reference marks corresponding to those of the image processing circuit 41, and the overlapping description is omitted.

Figure 18:
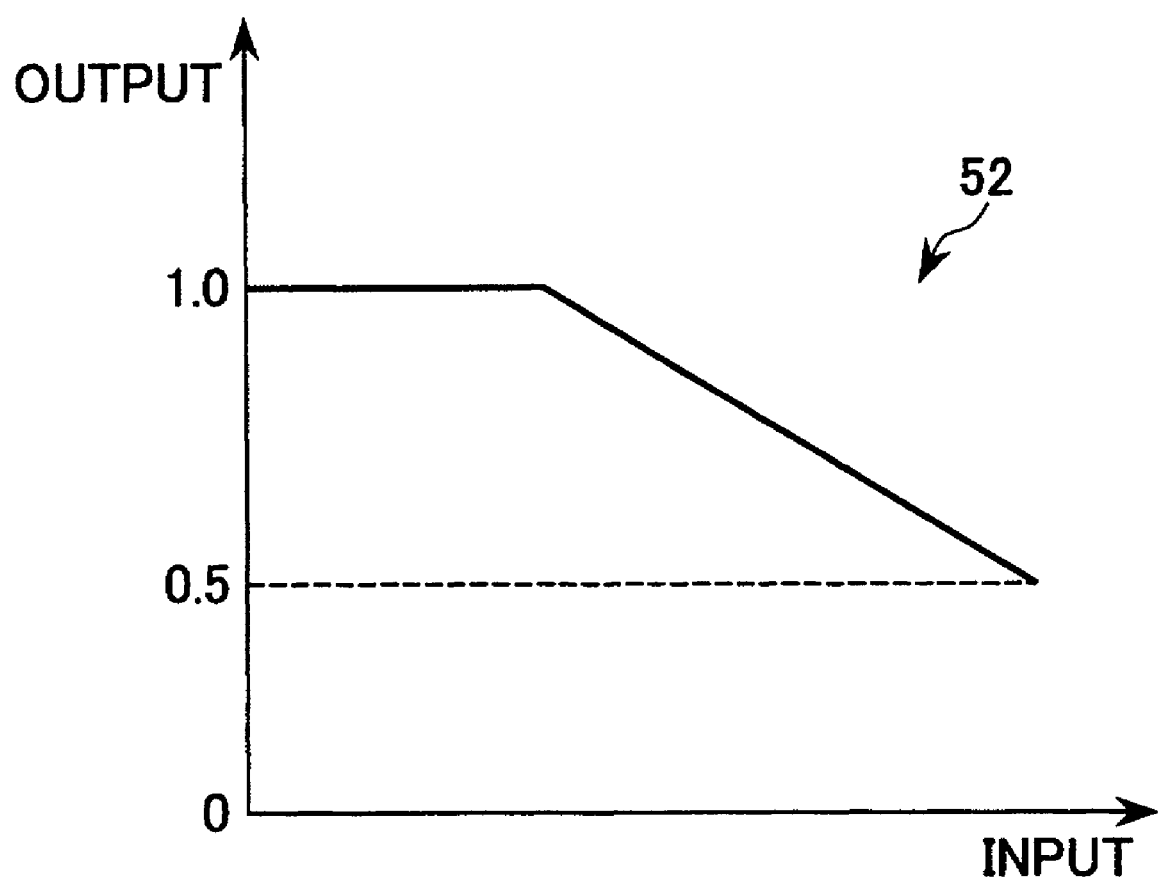
FIG. 18 is a characteristic curve diagram for illustrating a characteristic of the lookup table 52 of the image processing circuit shown in FIG. 15.

The image processing circuit 51 sets the gain of the multiplier 43 by accessing a look-up table 52 by the output value s(i, j) of the smoothed image S. Here, the input-output characteristic of the look-up table 52 is set as shown in FIG. 18. Hereby, the look-up table 52 sets the gain of the multiplier 43 at a constant gain when the output value s(i, j) is equal to a prescribed value or less, and sets the gain so as to approach gradually to the value one when the output value s(i, j) increases to be equal to the prescribed value or more.

Thereby, the image processing circuit 51 is configured so as to decrease the extent of the emphasis of contrast in a region where the pixel value has a large value. That is, there are many cases where the contrast is also sufficiently large at the vicinity of a pixel having a large pixel value in general images. Accordingly, if the contrast is uniformly emphasized, the contrast is emphasized more than the extent to be needed in the vicinity of such a pixel, and the output image is observed to be inferior in its quality by that extent in the results of the processing. However, if the degree of the emphasis of the contrast in the region where the pixel values are large is decreased like the present embodiment, the image with natural high quality can be output as a whole.

According to the configuration shown in FIG. 17, by varying the degree of emphasizing in accordance with the pixel value, the image with the far higher quality can be output.

(6) Fourth Embodiment

Figure 19:
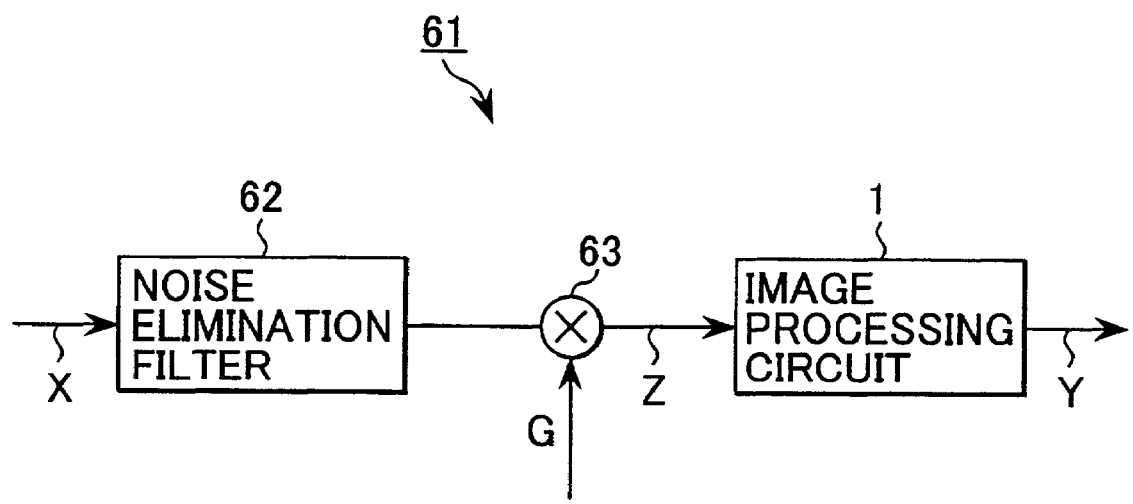
FIG. 19 is a block diagram showing an image processing circuit according to a fourth embodiment of the present invention.

FIG. 19 is a block diagram showing an image processing circuit according to a fourth embodiment of the present invention in comparison with the embodiment shown in FIG. 15.

Figure 20A:
FIGS. 20A–20C are timing charts for illustrating the operation of the image processing circuit shown in FIG. 19.
Figure 20B:
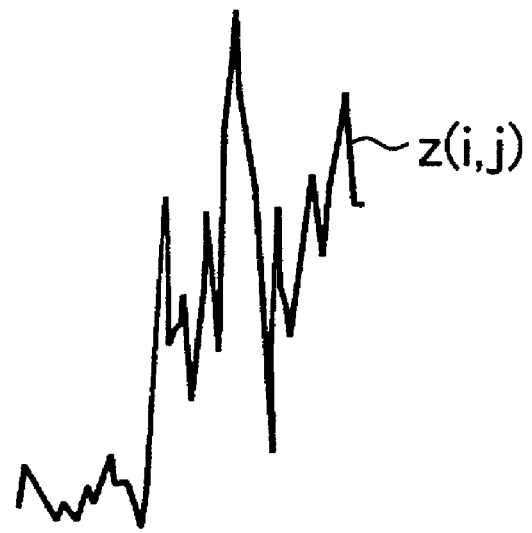
Figure 20C:

The image processing circuit 61, as shown in FIG. 19, eliminates noises of the input image X in advance with a noise elimination filter 62, and then enlarges the dynamic range of the input image X by the multiplication of a uniform gain with the successive multiplier 63 (FIG. 20A and FIG. 20B). After the multiplication processing, the image processing circuit 61 compresses the dynamic range with the image processing circuit 1 to the original dynamic range of the input image X, and outputs the processing results (FIG. 20C).

Here, as for the noise elimination filter 62, general coring processing, a median filter, an ε filter or an improved ε filter is applied. Moreover, in the present embodiment, the image processing circuit 1 corrects a pixel value at a fixed gain to the pixels having a pixel value larger than a prescribed pixel value, and corrects a pixel value so that the gain increases to the pixels having a pixel value equal to the prescribed pixel value or less contrary to the characteristic mentioned above about FIG. 6.

According to the configuration shown in FIG. 19, the processing such as the correction of gradation can be executed with evading the deterioration of the image quality effectively of the image having extremely high contrasts such as back-lighted image.

Figure 6:
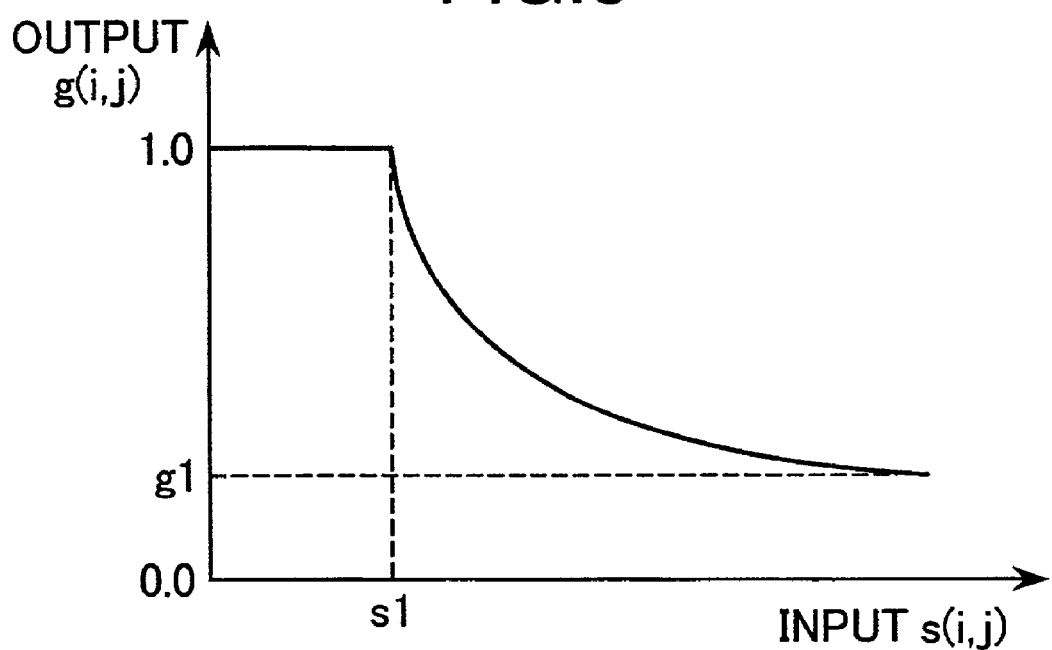
FIG. 6 is a characteristic curve diagram showing a characteristic of the lookup table 3 of the image processing circuit shown in FIG. 4.

That is, in the image processing circuits mentioned above by reference to FIG. 4 and so forth, by the correction of the pixel value in accordance with the characteristic of monotonous decrease as shown in FIG. 6, the dynamic range of an input image X is compressed by lowering the brightness in only the light part of the input image X without lowering the brightness in the dark part of the input image X. However, by the present embodiment, the whole contrast can be compressed by raising the brightness only in the dark part of the input image X while the brightness of the part having the moderate light of the input image X is compressed not to become brighter than the present brightness by compressing the dynamic range of the input image X in accordance with the characteristic contrary to the characteristic shown in FIG. 6. The processing such as the back-lighted correction can be thereby accomplished.

(7) Fifth Embodiment

FIG. 21 is a block diagram showing an image processing circuit 71 in accordance with a fifth embodiment of the present invention. In the image processing circuit 71, the matrix circuit 72 performs the computation processing of color signals R, G and B of red, green and blue, respectively, to generate a luminance signal Y and color difference signals R-Y, B-Y.

The image processing circuit 1 compresses the dynamic range of the luminance signal Y by processing the luminance signal Y selectively and outputs the processing results. By compressing only the luminance signal Y selectively by the image processing circuit 1, the image processing circuit 71 prevents the change of the ratios of signal levels among the color signals R, B and G of red, blue and green, and thereby prevents the change of hue owing to the change of the ratios.

The dividers 73 and 74 normalize the color difference signals R-Y, B-Y by the luminance signal Y by dividing the color difference signals R-Y, B-Y by the luminance signal Y severally. The delay circuits 77 and 78 delay the color difference signals R-Y, B-Y output from the dividers 73 and 74 for an amount of the processing time with the image processing circuit 1 to output them. The multipliers 77 and 78 correct the pixel value of the color difference signal normalized with the dividers 73 and 74 by multiplying the luminance signal Y output from the image processing circuit 1 by the color difference signals R-Y, B-Y output from the delay circuits 77 and 78, respectively.

That is, even if only the dynamic range of the luminance signal is compressed, because the color difference signals are difference signals between the luminance signal and a color signal, the ratio of the component of saturation is raised at the corresponding luminance level when no correction of the signal level of the color difference signals is performed. In the end, the saturation becomes high when the image is seen as a whole.

Accordingly, the image processing circuit in accordance with the present embodiment normalizes the color difference signal components with the luminance signal component in advance to compress the dynamic range of the luminance signal component. After that, the image processing circuit in accordance with the present embodiment corrects the pixel value of the color difference signal components normalized by the pixel value of the luminance signal component. Thereby, the embodiment preferably compresses the dynamic range of the color image signals by preventing the change in a color saturation.

(8) Other Embodiments

Incidentally, in the aforesaid embodiments, a case where an edge is judged by the approximation comprising a linear function and a pixel value is replaced in the improved ε filter is described. However, the present invention is not limited to such a case only. For example, by the approximation of a quadratic function or the like, these processing may be performed.

Moreover, in the aforesaid embodiments, a case where an edge is judged by the approximation by means of a function and the pixel value is replaced in the improved ε filter is described. However, the present invention is not limited to the case. The approximation by a function may be used only for the judgment of an edge or only for the replacement of a pixel value.

Moreover, in the aforesaid embodiments, a case where continuing pixel values are sampled at a prescribed sampling pitch to process them in the improved ε filter is described. However, the present invention is not limited to the case. All the continuing pixels may be used to process if a circuit with a sufficient capability is available in practice or the like.

Moreover, in the aforesaid embodiments, a case where the input image is smoothed by repetition of the smoothing processing of the improved ε filter is described. However, the present invention is not limited to the case. The repetition processing may be omitted if practically sufficient characteristics can be obtained in other ways.

Moreover, in the aforesaid embodiments, a case where the non-linear smoothing unit is configured by the improved ε filter is described. However, the present invention is not limited to the case. Alternatively, the non-linear smoothing unit may be configured using a usual ε filter.

Moreover, in the aforesaid embodiments, a case where the input-output characteristic is finally corrected with the look-up table 6 is described. However, the present invention is not limited to the case. The processing using the look-up table 6 may be omitted, or the look-up table 3 may also be used for correcting the characteristic.

Moreover, in the aforesaid embodiments, a case where the image processing circuit is configured so as to process pixel values at each circuit block is described. However, the present invention is not limited to the case. The whole or a part of the circuits may be used to process with the computation processing.

According to the present invention, a gain correction coefficient is obtained by smoothing an input image while preserving the edge of the input image, and corrects the pixel number of an input image by means of the obtained gain correction coefficient, and thereby the present invention effectively avoids the lowering of an impression concerning the contrast and the unnatural edge emphasis of the input image and makes it possible to compress the dynamic range of the input image in a higher compression rate.

Although the invention has been described in its preferred form with a certain degree of particularity, obviously many changes and variations are possible therein. It is therefore to be understood that the present invention may be practiced than as specifically described herein without departing from scope and the spirit thereof.

What is claimed is:

1. A method for processing an image to compress a dynamic range of an input image, said method comprising the steps of:
smoothing a pixel value of the input image while preserving an edge of the input image;
generating a gain correction coefficient in accordance with an output value at said smoothing step; and
correcting said pixel value of the input image on a basis of said gain correction coefficient,
wherein said step of smoothing includes the steps of:
filtering a low frequency component from the input image;
performing a logarithmic transformation of said pixel value after said step of filtering;
performing nonlinear filtering to suppress a high frequency component of the image while preserving an edge of the image after said step of logarithmic transformation; and
performing an inverse logarithmic transformation of said pixel value after said step of nonlinear filtering.

2. The method according to claim 1, wherein,
said step of nonlinear filtering includes the step of repeating a plurality of filtering wherein
at said plurality of filtering, said pixels value of the input image is sampled at different pitch from each other and the high frequency component of the image is suppressed while preserving edges of the image.

3. The method according to claim 1, wherein said step of nonlinear filtering is performed by sampling continuous pixels at a prescribed pitch.

4. The method according to claim 1, wherein said step of nonlinear filtering includes the steps of:
generating an approximation function approximating low frequency components of pixel values of pixels within a prescribed extent based on a pixel to be processed;
setting a region corresponding to said low frequency components on a basis of said approximation function;
replacing selectively a pixel value, which is judged to be within said region by judging whether said pixel value is within said region or not concerning respective pixel values in the prescribed extent based on said pixel to be processed, with a corresponding pixel value of said approximation function in accordance with a result of said judging; and
performing weighted addition operation of said pixel value replaced at said step of replacing.

5. A method for processing an image to compress a dynamic range of an input image, said method comprising the steps of:
smoothing a pixel value of the input image while preserving an edge of the input image;
generating a gain correction coefficient in accordance with an output value at said smoothing step; and
correcting said pixel value of the input image on a basis of said gain correction coefficient,
wherein said gain correction coefficient with respect to an output value at said step of smoothing has a monotonically decreasing characteristic.

6. A method for processing an image to compress a dynamic range of an input image, said method comprising the steps of:
smoothing a pixel value of the input image while preserving an edge of the input image;
generating a gain correction coefficient in accordance with an output value at said smoothing step;
correcting said pixel value of the input image on a basis of said gain correction coefficient;
eliminating noises of the input image before smoothing the pixel value of the input image; and
enlarging said dynamic range of the input image by multiplying said pixel value of the input image after said step of eliminating noise by a uniform gain to provide said pixel value to said steps of smoothing and correcting said pixel value,
wherein said step of eliminating noises includes coring processing.

7. A method for processing an image to compress a dynamic range of an input image, said method comprising the steps of:
smoothing a pixel value of the input image while preserving an edge of the input image;
generating a gain correction coefficient in accordance with an output value at said smoothing step;
correcting said pixel value of the input image on a basis of said gain correction coefficient;
eliminating noises of the input image before smoothing the pixel value of the input image; and
enlarging said dynamic range of the input image by multiplying said pixel value of the input image after said step of eliminating noise by a uniform gain to provide said pixel value to said steps of smoothing and correcting said pixel value,
wherein said step of elimination noises includes processing of a median filter.

8. A method for processing an image to compress a dynamic range of an input image, said method comprising the steps of:
smoothing a pixel value of the input image while preserving an edge of the input image;
generating a gain correction coefficient in accordance with an output value at said smoothing step;
correcting said pixel value of the input image on a basis of said gain correction coefficient;
eliminating noises of the input image before smoothing the pixel value of the input image; and
enlarging said dynamic range of the input image by multiplying said pixel value of the input image after said step of eliminating noise by a uniform gain to provide said pixel value to said steps of smoothing and correcting said pixel value,
wherein said step of elimination noises comprises the steps of:
replacing selectively a pixel value after judging based on a pixel value of a pixel to be processed concerning pixel values in a prescribed extent based on said pixel to be processed in accordance with said judging; and
performing weighted addition operation of said pixel value replaced at said step of replacing.

9. A method for processing an image to compress a dynamic range of an input image, said method comprising the steps of:

smoothing a pixel value of the input image while preserving an edge of the input image;

generating a gain correction coefficient in accordance with an output value at said smoothing step; and correcting said pixel value of the input image on a basis of said gain correction coefficient;

normalizing a color difference signal component of said input image by means of a luminance signal component of said input image before smoothing the pixel value of the input image to provide a pixel value based on the luminance signal component to said steps of smoothing and correcting said pixel value; and correcting a pixel value of said color difference signal after normalizing by means of said pixel value based on said luminance signal component after said pixel value correcting.

* * * * *